United States Patent
Kitamura et al.

[11] Patent Number: 5,879,586
[45] Date of Patent: Mar. 9, 1999

[54] METHOD FOR PRODUCING ALUMINATE PHOSPHOR

[75] Inventors: Koji Kitamura, Osaka; Shozo Oshio, Nara; Teruaki Shigeta, Osaka; Shigeru Horii, Osaka; Takeshi Nishiura, Osaka; Tomizo Matsuoka, Osaka, all of Japan

[73] Assignee: Matsushita Electric Industrial Co., Ltd., Osaka, Japan

[21] Appl. No.: 721,934

[22] Filed: Sep. 27, 1996

[30] Foreign Application Priority Data

Sep. 29, 1995 [JP] Japan .................................. 7-253917
Mar. 29, 1996 [JP] Japan .................................. 8-077126

[51] Int. Cl.$^6$ ........................... C09K 11/64; C09K 11/77; C09K 11/55
[52] U.S. Cl. ..................................... 252/301.4 R; 313/483
[58] Field of Search ...................... 252/301.4 R; 313/483

[56] References Cited

U.S. PATENT DOCUMENTS

| | | | |
|---|---|---|---|
| 3,294,699 | 12/1966 | Lange | 252/301.4 R |
| 4,161,457 | 7/1979 | Takahashi et al. | 252/301.4 |
| 4,246,630 | 1/1981 | Wolfe | 252/301.4 R |
| 4,524,300 | 6/1985 | Rutten et al. | 313/487 |
| 4,631,144 | 12/1986 | Beers et al. | 252/301.4 R |
| 4,795,588 | 1/1989 | Pet et al. | 252/301.4 |
| 4,806,825 | 2/1989 | Catherall et al. | 313/486 |

FOREIGN PATENT DOCUMENTS

| | | |
|---|---|---|
| 0 286 180 | 10/1988 | European Pat. Off. . |
| 62-201989 | 9/1987 | Japan . |
| 2-170888 | 7/1990 | Japan . |
| 7-268319 | 10/1995 | Japan . |
| 997600 | 2/1963 | United Kingdom . |
| 2259095 | 3/1993 | United Kingdom . |

OTHER PUBLICATIONS

Verstegen, "A Survey of a Group of Phosphors, Based on Hexagonal Aluminate and Gallate Host Lattices", *The Journal of Electrochemical Society*, vol. 121, No. 12 (1974), pp. 1623–1627.

*Primary Examiner*—Melissa Bonner
*Attorney, Agent, or Firm*—Merchant, Gould, Smith, Edell, Welter & Schmidt, P.A.

[57] ABSTRACT

An alkaline earth metal compound containing no fluorine atoms in its molecules, a rare earth compound containing no fluorine atoms in its molecules, and an aluminum compound containing no fluorine atoms in its molecules are fired in a high-temperature reducing atmosphere ranging from 1600° to 2000° C., so that an aluminate phosphor, the particle diameter and shape thereof are controlled, is provided. A mixture of 22 wt % of barium carbonate, 11 wt % of basic magnesium carbonate, 65 wt % of spherical alpha-alumina of 10 μm diameter and 2 wt % of europium oxide is fired in a mixed gas atmosphere consisting of gaseous hydrogen of 5 volume % and gaseous nitrogen. The temperature is raised at 400° C./hr, and lowered at 400° C./hr after firing for two hours at 1700° C. As a result, a spherical aluminate phosphor of 10 μm diameter, which is expressed by formula $(Ba_{0.9}, Eu_{0.1})MgAl_{10}O_{17}$ is obtained.

24 Claims, 5 Drawing Sheets

METHOD FOR PRODUCING ALUMINATE PHOSPHOR

FIELD OF THE INVENTION

This invention relates to a method for producing a phosphor used for a fluorescent lamp and a display, etc.

BACKGROUND OF THE INVENTION

Aluminate phosphor for tri-band fluorescent lamps, which was developed by J. M. P. J. Verstegen and the others, has been commonly used with the spread of tri-band fluorescent lamps.

Such an aluminate phosphor is produced by a method, for example, taught in The Journal of Electrochemical Society 121 (1974) p.1623–1627. An aluminate phosphor described by a general formula $(Ba_{0.86}Eu_{0.14})Mg_2Al_{16}O_{27}$ is produced by firing materials comprising barium carbonate, europium oxide, magnesium carbonate and alumina in a hydrogen reducing atmosphere at 1200° C.

A fluorine compound like aluminum fluoride or magnesium fluoride is added to the materials so that the crystallinity of the aluminate phosphor is improved, so as not to deteriorate during a heating treatment when the aluminate phosphor is coated on a device such as a fluorescent lamp or a display. The quantity of the fluorine compound is varied to control the particle diameter and the shape of the aluminate phosphor, so that the phosphor can be coated on the device more uniformly.

In a conventional method for producing an aluminate phosphor, a fluorine compound such as aluminum fluoride is added to improve its crystallinity and to control the diameter and the shape.

The method, however, costs more than the material cost because of the sublimation characteristics of the added fluorine compound. Furthermore, the firing furnace will be corroded and damaged because of the corrosiveness of the fluorine compound. On the other hand, the crystallinity of the aluminate phosphor does not improve and controlling of the particle diameter and the shape cannot be conducted if the fluorine compound is not added.

SUMMARY OF THE INVENTION

In order to solve these and other problems, this invention aims to provide a method for producing an aluminate phosphor. According to this method, the crystallinity is improved and the diameter and shape of the particles are controlled, without adding any fluorine compounds such as aluminum fluoride.

In order to achieve the above-mentioned purpose, the method for producing an aluminate phosphor of this invention fires an alkaline earth metal compound, a rare earth compound, and an aluminum compound in a reducing atmosphere at a temperature from 1600° to 2000° C. The compounds do not contain fluorine atoms in their molecules.

It is preferable that the reducing atmosphere is a mixture of gaseous hydrogen and gaseous nitrogen.

It is also preferable that the concentration of the gaseous hydrogen ranges from 0.1 to 10 volume % of the reducing atmosphere consisting of the mixture of gaseous hydrogen and gaseous nitrogen.

It is further preferable that the firing time is at least five minutes.

It is preferable that the alkaline earth metal compound is a barium compound and a magnesium compound containing no fluorine atoms in their molecules, the rare earth compound is an europium compound containing no fluorine atoms in its molecules, and the aluminate phosphor comprises the materials expressed by the following formula:

$$(Ba_{1-w}Eu_w) Mg_xAl_yO_z,$$

where $0.03 \leq w \leq 0.3$, $0.8 \leq x \leq 1.2$, $8 \leq y \leq 12$, and $14 \leq z \leq 20$.

It is preferable that the alkaline earth metal compound is a magnesium compound containing no fluorine atoms in its molecules, the rare earth compound is a cerium compound and a terbium compound containing no fluorine atoms in their molecules, and the aluminate phosphor comprises the materials expressed by the following formula:

$$(Ce_{1-w}Tb_w) Mg_xAl_yO_z,$$

where $0.03 \leq w \leq 0.6$, $0.8 \leq x \leq 1.2$, $9 \leq y \leq 13$, and $15z \leq 23$.

It is also preferable that the alkaline earth metal compound is a strontium compound containing no fluorine atoms in its molecules, the rare earth compound is an europium compound containing no fluorine atoms in its molecules, and the aluminate phosphor comprises the materials expressed by the following formula:

$$(Sr_{4(1-w)}Eu_{4w}) Al_xO_y,$$

where $0.01 \leq w \leq 0.6$, $11 \leq x \leq 17$, and $20 \leq y \leq 30$.

It is further preferable that the particle diameter of the aluminum compound containing no fluorine atoms in its molecules is the same or substantially the same as that of the desired aluminate phosphor.

It is still preferable that the particle diameter of the aluminum compound containing no fluorine atoms in its molecules ranges from 1 to 20 μm.

It is also preferable that the particle shape of the aluminum compound containing no fluorine atoms in its molecules is the same or substantially the same as that of the desired aluminate phosphor.

It is preferable that the aluminum compound is spherical or substantially spherical.

It is further preferable that the alkaline earth metal compound containing no fluorine atoms in its molecules is at least one selected from the group consisting of oxide, carbonate, basic carbonate, nitrate and chloride of an alkali earth metal.

It is also preferable that the rare earth compound containing no fluorine atoms in its molecules is at least one selected from the group consisting of oxide, carbonate, basic salt, nitrate and chloride of a rare earth element.

It is also preferable that the aluminum compound containing no fluorine atoms in its molecules is at least one selected from the group consisting of oxide, chloride, nitrate, sulfate and alkoxide of aluminum.

In the method for producing an aluminate phosphor of this invention, an alkaline earth metal compound containing no fluorine atoms in its molecules, a rare earth compound containing no fluorine atoms in its molecules, and an aluminum compound containing no fluorine atoms in its molecules are fired in a high-temperature reducing atmosphere ranging from 1600° to 2000° C., so that the reaction is promoted and the crystallinity can be improved without using any fluorine compounds. As a result, the crystallinity can be improved without using any fluorine compounds that easily sublimate and corrode, and a quality aluminate phosphor can be provided.

Fluorine compounds, which are easily sublimated and corroded, are not used in the producing method of this invention. Therefore, less components will be lost due to sublimation in the firing process, and the cost can be lowered. In addition to that, corrosion and damage of the firing furnace can be reduced.

The reducing atmosphere in the producing method of this invention is a mixture of gaseous hydrogen and gaseous nitrogen, so that a desirable reducing atmosphere can be provided at a comparatively low cost.

The concentration of the gaseous hydrogen of the reducing atmosphere ranges from 0.1 to 10 volume %, so that the synthesis of the aluminate phosphor can be conducted efficiently.

The firing time is predetermined to be at least five minutes in the method of this invention, so that the aluminate phosphor can be synthesized completely in order to provide a quality aluminate phosphor.

It is preferable in the producing method of this invention that the alkaline earth metal compound is a barium compound and a magnesium compound containing no fluorine atoms in their molecules, the rare earth compound is an europium compound containing no fluorine atoms in its molecules, and the aluminate phosphor is expressed by the following formula:

$$(Ba_{1-w}Eu_w)Mg_xAl_yO_z,$$

where $$0.03 \leq w \leq 0.3,\ 0.8 < x \leq 1.2,\ 8 < y \leq 12,\ \text{and}\ 14 \leq z \leq 20.$$

Accordingly, the europium can luminesce efficiently and the obtained phosphor emits high-luminance blue light.

It is preferable in the producing method of this invention that the alkaline earth metal compound is a magnesium compound containing no fluorine atoms in its molecules, the rare earth compound is a cerium compound and a terbium compound containing no fluorine atoms in their molecules, and the aluminate phosphor is expressed by the following formula:

$$(Ce_{1-w}Tb_w)Mg_xAl_yO_z,$$

where $$0.03 \leq w \leq 0.6,\ 0.8 \leq x \leq 1.2,\ 9 \leq y \leq 13,\ 15 \leq z \leq 23.$$

Accordingly, the terbium can luminesce efficiently and the obtained phosphor emits high-luminance green light.

It is preferable in the producing method of this invention that the alkaline earth metal compound is a strontium compound containing no fluorine atoms in its molecules, the rare earth compound is a europium compound containing no fluorine atoms in its molecules, and the aluminate phosphor is expressed by the following formula:

$$(Sr_{4(1-w)}Eu_{4w})Al_xO_y,$$

where $$0.01 \leq w \leq 0.6,\ 11 \leq x \leq 17,\ 20 \leq y \leq 30.$$

Accordingly, the europium can luminesce efficiently and the obtained phosphor emits high-luminance blue-green light.

It is preferable in this invention that the aluminum compound containing no fluorine atoms in its molecules has the same or substantially the same particle diameter of the desired aluminum phosphor, so that the particle diameter can be easily controlled in the method for producing aluminum phosphor.

It is preferable that the particle diameter of the aluminum compounds ranges from 1 to 20 μm, so that the the aluminate phosphor will be coated efficiently on a device.

It is preferable in this invention that the aluminum compound containing no fluorine atoms in its molecules has the same or substantially the same particle shape of the desired aluminum phosphor, so that the particle shape can be easily controlled in the method for producing aluminum phosphor.

A spherical or a substantially spherical aluminum compound preferably should be used because the surface area of the phosphor becomes small, so that the luminance will deteriorate much less when the phosphor is heated in air in order to be coated on a device. In addition, it is also preferable that a phosphor which is spherical or substantially spherical is used for a fluorescent lamp or a display etc., because the transmissivity of a visible ray rises and the radiation efficiency improves.

It is further preferable that the alkaline earth metal compound containing no fluorine atoms in its molecules is at least one selected from the group consisting of oxide, carbonate, basic salt, nitrate and chloride of an alkaline earth metal, since the compounds are comparatively inexpensive, easily obtained, and comparatively stable.

It is also preferable that the rare earth compound containing no fluorine atoms in its molecules is at least one selected from the group consisting of oxide, carbonate, basic salt, nitrate and chloride of a rare earth element, since the compounds are comparatively inexpensive, easily obtained, and comparatively stable.

It is also preferable that the aluminum compound containing no fluorine atoms in its molecules is at least one selected from the group consisting of oxide, chloride, nitrate, sulfate and alkoxide of aluminum, since the compounds are comparatively inexpensive, easily obtained, and comparatively stable.

In a fluorescent lamp using a phosphor, the improvement where the phosphor is produced by the method of this invention, and thus, lighting life of a fluorescent lamp can be extended.

DETAILED DESCRIPTION OF THE INVENTION

In the method for producing an aluminate phosphor of this invention, an alkaline earth metal compound containing no fluorine atoms in its molecules, a rare earth compound containing no fluorine atoms in its molecules, and an aluminum compound containing no fluorine atoms in its molecules are fired in a high-temperature reducing atmosphere ranging from 1600° to 2000° C., so that the reaction is promoted and the crystallinity can be improved without using any fluorine compounds.

For the alkaline earth metal compound containing no fluorine atoms in its molecules, for example, oxide, carbonate, basic salt, nitrate or chloride of alkaline earth metals are preferably used in order to produce the aluminate phosphor, since they are comparatively inexpensive, easily obtained, and comparatively stable.

The following compounds are the preferable examples of alkaline earth metal compounds containing no fluorine atoms in their molecules: barium oxide, barium carbonate, barium nitrate, barium chloride, magnesium oxide, basic magnesium carbonate, magnesium nitrate, magnesium chloride, strontium oxide, strontium carbonate, strontium nitrate, strontium chloride, calcium oxide, calcium carbonate, calcium nitrate and calcium chloride.

In order to improve the luminance of the phosphor, manganese compounds containing no fluorine atoms in their molecules, such as manganese oxide, manganese chloride, manganese carbonate or manganese nitrate, can be added. The range of magnesium which can be replaced by manganese is from 0.01 to 100 atom %.

For the rare earth compound containing no fluorine atoms in its molecules, for example, oxide, carbonate, nitrate or chloride of rare earth elements are preferably used in order to produce the aluminate phosphor, since the compounds are comparatively inexpensive, easily obtained, and comparatively stable.

More specifically, preferable examples are europium oxide, cerium oxide, terbium oxide, lanthanum oxide, and samarium oxide. The above-described various kinds of compounds also can be used as well as the oxides.

For the aluminum compound containing no fluorine atoms in its molecule, oxide, chloride, nitrate and sulfate of aluminum and alkoxide of aluminum having C1–C4 alkoxy groups are preferably used since the compounds are comparatively inexpensive, easily obtained, and comparatively stable.

The following are preferable examples of aluminum compounds containing no fluorine atoms in their molecules: aluminum oxide, aluminum chloride, aluminum nitrate, aluminum sulfate, and tri-isopropoxy aluminum.

Alpha-alumina and gamma-alumina are taken as examples of the aluminum oxide. An aluminum compound which is not an oxide is preferably pre-fired in a oxidizing atmosphere in order to prevent any elements except oxygen from contaminating as impurities in the phosphor.

It is difficult to generally predetermine the percentage of the alkaline earth metal compound, the rare earth compound and the aluminum compound to be used, since it should be differed depending on the composition of the desired aluminate phosphor. As a standard, the alkaline earth metal compound ranges from 5 to 40%, the rare earth compound ranges from 0.1 to 10%, and the aluminum compound ranges from 50 to 90% in atomic percent conversion.

In the producing method of this invention, fluorine-containing compounds are not used. Therefore, it is preferable that the particle diameter and the shape of the aluminum compound and those of the material of the aluminate phosphor are made uniform, so that the aluminate phosphor will have desirable size and shape after firing process. As a result, an aluminate phosphor having uniform particle diameter and shape can be synthesized.

In the conventional technique where fluorine compounds are used, the particle of the obtained aluminate phosphor tends to be bigger and the shape will be a hexagonal plate as the quantity of the fluorine compounds increases. Therefore, it is difficult to control the particle diameter and/or the shape of the aluminate phosphor.

The synthesized aluminate phosphor is generally diffused in a proper quantity of an aqueous solvent or an organic solvent, by using a resin binder if necessary. Then the aluminate phosphor is coated on a device, and fixed on the device by heating in air at 600°–800° C. to eliminate the organic solvent, or by oxidizing the carbon in the resin binder and eliminating the carbon as carbon dioxide. It is preferable for this process that the shape and diameter of the particles are unified so that it can be coated evenly on the device.

In this invention, the diameter and the shape of the particle of the aluminum material is the same or substantially the same as that of the obtained aluminate phosphor, so that the diameter and shape of the aluminate phosphor particles can be controlled quite easily.

Though the desirable particle diameter of the aluminate phosphor depends on the devices, generally the phosphor can be well coated when the diameter is from 1 to 20 $\mu$m. The range preferable for a fluorescent lamp is generally 1 to 10 $\mu$m.

Though the particle shape of the aluminate phosphor should be varied depending on the desirable use, preferable examples are flat plate, hexagonal plate, spherical, capillary, and a cubic having comparatively acute angles.

When the synthesized aluminate phosphor is applied to a fluorescent lamp or to a display, the aluminate phosphor is heated in air at 600°–800° C. to be fixed to the device. It has been found from the inventors' experiments that, therefore, the surface is oxidized and the luminance deteriorates. In order to solve this problem, a spherical or a substantially spherical aluminate phosphor should preferably be used because the surface area of the phosphor becomes small, so that the luminance will deteriorate much less when the phosphor is heated in air.

The aluminum compound for the spherical aluminate phosphor is, for example, an aluminum compound like alpha-alumina which is made spherical by exposing to a high-temperature atmosphere (e.g. by irradiating plasma) and then quick-quenching. Another example is a highly-purified spherical alumina named "admafine" by Admatechs Co., Ltd., which is made spherical by a self-firing method.

As the aluminum compound to be the substantially spherical aluminate phosphor, for example, an alumina "Sumicorundom" by Sumitomo Chemical Company Ltd. can be used. "Sumicorundom" is polyhedron (e.g. octahedron) aluminum oxide manufactured by crystallizing after a gasifying process.

It is also preferable that a phosphor which is spherical or substantially spherical is used for a fluorescent lamp or a display etc., because the transmissivity of a visible ray rises and the radiation efficiency improves. Due to the above-mentioned reasons, aluminate phosphor having desired particle diameter and shape can be obtained by the method of this invention by using aluminum compounds whose particle diameter and shape are substantially identical to those of the produced aluminate phosphor.

It is preferable in the producing method of this invention that the alkaline earth metal compound is a barium compound and a magnesium compound containing no fluorine atoms in their molecules, the rare earth compound is an europium compound containing no fluorine atoms in its molecules, and the aluminate phosphor is expressed by the following formula:

$(Ba_{1-w}Eu_w)Mg_xAl_yO_z$, where $0.03 \leq w \leq 0.3$, $0.8 \leq x \leq 1.2$, $8 \leq y \leq 12$, and $14 \leq z \leq 20$.

Accordingly, the europium can luminesce efficiently and the obtained phosphor emits high-luminance blue light.

The above-mentioned composition can be obtained by mixing the alkaline earth metal compound, the rare earth compound, and the aluminum compound to have the ratio shown in the above formula and then, firing the mixture in the reducing atmosphere. Other compositions also can be obtained using the same process.

It is preferable in the producing method of this invention that the alkaline earth metal compound is a magnesium compound containing no fluorine atoms in its molecules, the rare earth compound is a cerium compound and a terbium compound containing no fluorine atoms in their molecules, and the aluminate phosphor is expressed by the following formula:

$(Ce_{1-w}Tb_w)Mg_xAl_yO_z$, where $0.03 \leq w \leq 0.6$, $0.8 \leq x \leq 1.2$, $9 \leq y \leq 13$, $15 \leq z \leq 23$.

Accordingly, the terbium can luminesce efficiently and the obtained phosphor emits high-luminance green light.

It is preferable in the producing method of this invention that the alkaline earth metal compound is a strontium compound containing no fluorine atoms in its molecules, the rare earth compound is a europium compound containing no fluorine atoms in its molecules, and the aluminate phosphor is expressed by the following formula:

$(Sr_{4(1-w)}Eu_{4w})Al_xO_y$, where $0.01 \leq w \leq 0.6$, $11 \leq x < 17$, $20 < y \leq 30$.

Accordingly, the europium can luminesce efficiently and the obtained phosphor emits high-luminance blue-green light.

EXAMPLE 1

An aluminate phosphor expressed as $(Ba_{0.9} \cdot Eu_{0.1})MgAl_{10}O_{17}$ (hereinafter a BAM phosphor) is explained below referring to Table 1.

TABLE 1

| Raw materials | Weight % |
|---|---|
| Barium carbonate (BaCO$_3$) | 22.0 |
| Europium oxide (Eu$_2$O$_3$) | 2.0 |
| Basic magnesium carbonate (4MgCO$_3$ · Mg(OH)$_2$ · 3H$_2$O) | 11.0 |
| Alpha-alumina (Al$_2$O$_3$) | 65.0 |

Barium carbonate and basic magnesium carbonate were used for the alkaline earth metal compound, alpha-alumina was used for the aluminum compound, and europium oxide was used for the rare earth compound.

The raw materials of the weight % shown in Table 1 were mixed and pulverized in a mortar or in a ball mill. Then the powder was fired in a tube furnace by using a mixture of gaseous nitrogen and gaseous hydrogen. The flow quantity of the nitrogen was 380 ml/minute, and that of the hydrogen was 20 ml/minute. The hydrogen concentration was 5 volume %. The temperature was raised at 400° C./hr, and then lowered at 400° C./hr after the powder was fired for two hours at 1700° C. As a result, the above-mentioned BAM phosphor was synthesized. During the firing process, the hydrogen concentration can be lowered to 0.1 volume % since hydrogen is easily deoxidized. The hydrogen concentration is preferably 10 volume % or less, since if the value exceeds 10 volume %, its reducing characteristic will prevent the BAM phosphor from being synthesized. The firing takes only five minutes because the diffusing reaction proceeds fast at a high temperature of 1600° C. or higher.

Figure 1:
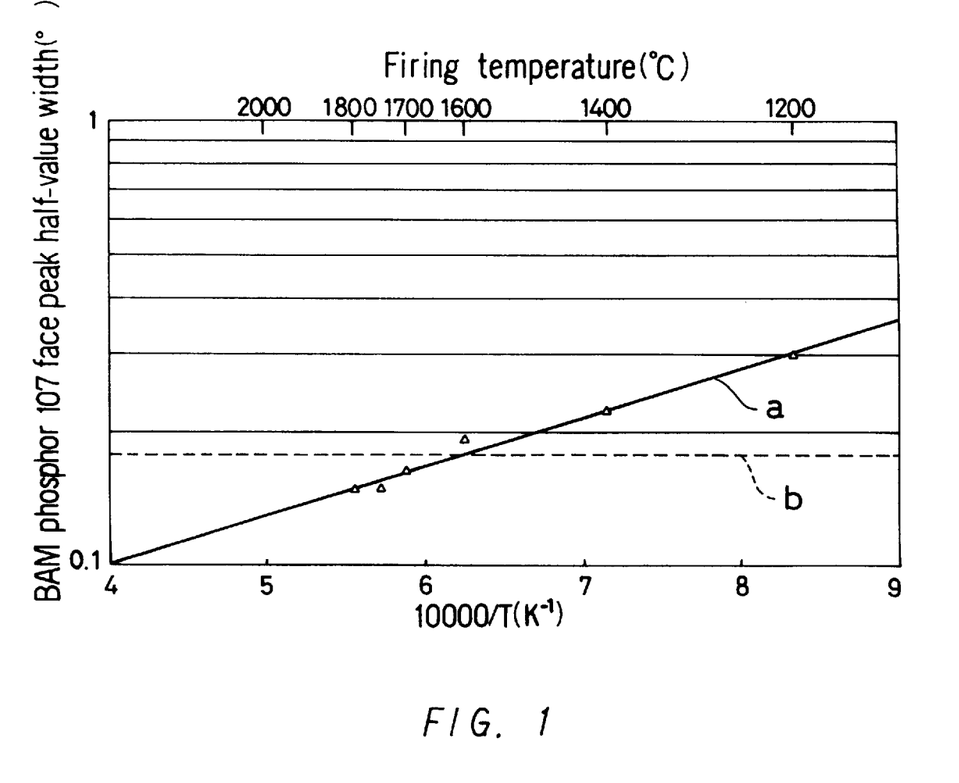
FIG. 1 is a graph to show the relationship between the firing temperature and the crystallinity of the obtained aluminate phosphor of Example 1.

The high-crystallization of the BAM phosphor is explained referring to FIG. 1. In FIG. 1, the vertical axis indicates the half-value width of the 107 face of the BAM phosphor crystals (the strength peak of X-ray diffraction spectrum).

The half-value width of the X-ray diffraction spectrum indicates the crystallinity of the BAM phosphor. The crystallinity is higher as the half-value width is smaller. The luminance of the BAM phosphor generally deteriorates during the heating treatment when the phosphor is coated on a fluorescent lamp or on a display. It has been found from the experiments by the inventors that the deterioration can be reduced as the crystallinity is high.

The horizontal axis indicates the inverse of the firing temperature (K) for synthesis of the BAM phosphor. The firing temperature (° C.) is indicated for reference on the upper side of FIG. 1. The Δ marks in FIG. 1 are the survey data of the half-value width of the BAM phosphor's X-ray diffraction spectrum. The solid line (a) is a linear function of the half-value width of the survey data of the X-ray diffraction spectrum fitted by using the least square method. The broken line (b) is a half-value width of the 107 face of the X-ray diffraction spectrum of a conventional BAM phosphor containing fluorine compounds.

As shown by the line (a), the half-value width of the X-ray diffraction spectrum becomes smaller as the firing temperature of the BAM phosphor of this invention is raised. When the temperature exceeds 1600° C., the width becomes smaller than that of the conventional BAM phosphor containing fluorine compounds (line (b)). In other words, the crystallinity becomes higher than that of the conventional BAM phosphor containing fluorine compounds as a reaction accelator.

It has been also found out that the BAM phosphor fuses at a temperature higher than 2000° C. Therefore in FIG. 1, the half-value width of the X-ray diffraction spectrum is actually saturated when the temperature exceeds 2000° C.

The reaction is promoted by firing in a high temperature reducing atmosphere of 1600° to 2000° C. As a result, the crystallinity is improved without using fluorine compounds, and a BAM phosphor having high luminance can be obtained.

EXAMPLE 2

Example 2 of this invention is explained below referring to Table 2. Table 2 shows the kinds and weight % of the raw material for synthesizing an aluminate phosphor expressed by a formula: $Ce_{0.67} \cdot Tb_{0.33})MgAl_{11}O_{19}$ (hereinafter, CAT phosphor).

TABLE 2

| Raw materials | Weight % |
|---|---|
| Cerium oxide ($CeO_2$) | 20.0 |
| Terbium oxide ($Tb_4O_7$) | 6.8 |
| Basic magnesium carbonate ($4MgCO_3 \cdot Mg(OH)_2 \cdot 3H_2O$) | 10.2 |
| Alpha-alumina ($Al_2O_3$) | 63.0 |

Basic magnesium carbonate was used for the alkaline earth metal compound, alpha-alumina was used for the aluminum compound, and cerium oxide and terbium oxide were used for the rare earth compound.

The raw materials of the weight % shown in Table 2 were mixed and pulverized in a mortar or in a ball mill. And the powder was fired in a tube furnace by using a mixture of gaseous nitrogen and gaseous hydrogen.

The flow quantity of the nitrogen was 380 ml/minute, and that of the hydrogen was 20 ml/minute. The hydrogen concentration was 5 volume %. The temperature was raised at 400° C./hr, and then lowered at 400° C./hr after the powder was fired for two hours at 1700° C. As a result, the above mentioned CAT phosphor was synthesized.

Figure 2:
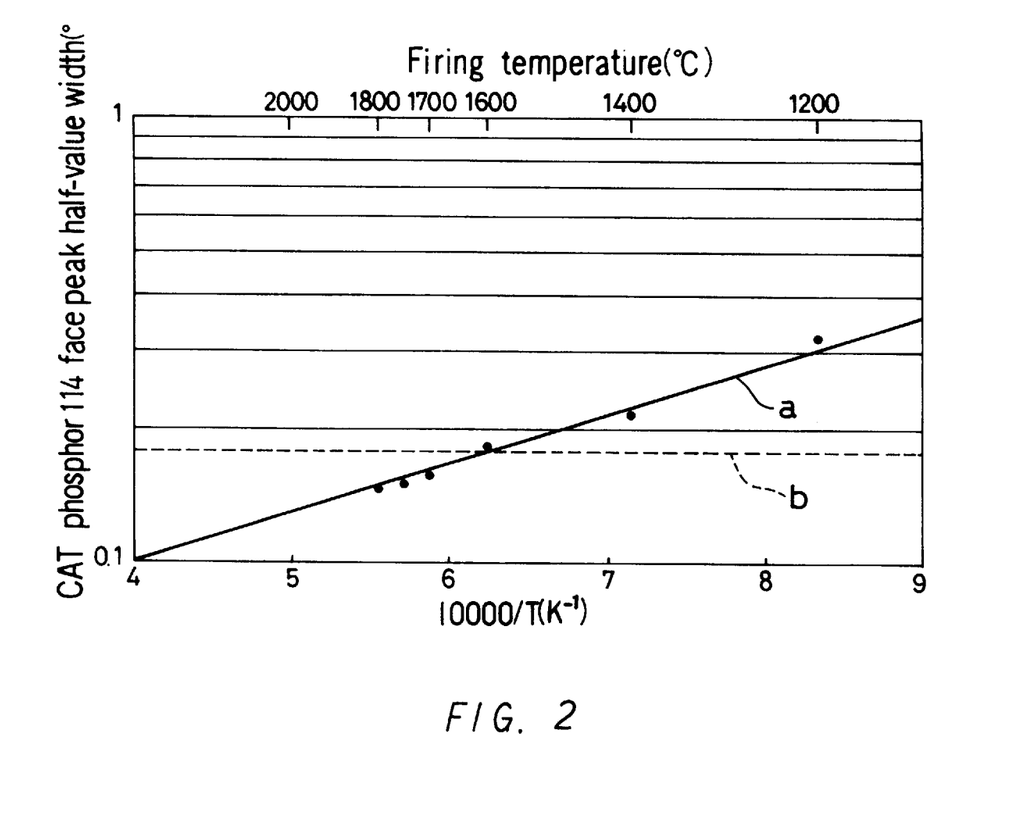
FIG. 2 is a graph to show the relationship between the firing temperature and the crystallinity of the obtained aluminate phosphor of Example 2.

The crystallization of the CAT phosphor is explained referring to FIG. 2. In FIG. 2, the vertical axis indicates the half-value width of the 114 face of the CAT phosphor crystals (the strength peak of X-ray diffraction spectrum).

The half-value width of the X-ray diffraction spectrum indicates the crystallinity of the CAT phosphor. The crystallinity is higher as the half-value width is smaller. The luminance of the CAT phosphor generally deteriorates during the heating treatment when the phosphor is coated on a fluorescent lamp or on a display. It has been found from the experiments by the inventors that the deterioration can be reduced as the crystallinity is high.

The horizontal axis indicates the inverse of the firing temperature (K) of the CAT phosphor synthesis. The firing temperature (° C.) is indicated for reference on the upper side of FIG. 2. The ● marks in FIG. 2 are the survey data of the half-value width of the CAT phosphor's X-ray diffraction spectrum. The solid line (a) is a linear function of the half-value width of the survey data of the X-ray diffraction spectrum fitted by using the least square method. The broken line (b) is a half-value width of the 114 face of the X-ray diffraction spectrum of a conventional CAT phosphor where fluorine compounds are used.

As shown by the line (a) of FIG. 2, the half-value width of the X-ray diffraction spectrum becomes smaller as the firing temperature of the CAT phosphor of this invention is raised. The width becomes smaller than that of the conventional CAT phosphor containing fluorine compounds (line (b)) when the temperature exceeds 1600° C. In other words, the crystallinity becomes higher than that of the conventional CAT phosphor containing fluorine compounds as a reaction accelator.

It has been also found out that the CAT phosphor fuses at a temperature higher than 2000° C. like the BAM phosphor of Example 1. Therefore in FIG. 2, the half-value width of the X-ray diffraction spectrum is actually saturated when the temperature exceeds 2000° C.

The reaction is promoted by firing under a high temperature reducing atmosphere of 1600° to 2000° C. As a result, the crystallinity is improved without using fluorine compounds, and a CAT phosphor having high luminance can be obtained.

EXAPMLE 3

A method for producing an aluminate phosphor where the particle diameter and shape thereof are substantially the same as those of an aluminum compound used as a raw material is explained below referring to FIGS. 3A–3D.

FIGS. 3A–3D are schematic views to show the reaction condition in the process of producing aluminate phosphors of Example 3. In this process, spherical alumina having 10 μm diameter is used for the raw material (aluminum compounds). In this Example, BAM phosphor is used for explanation as in Example 1. The synthesizing process also corresponds to Example 1.

Figure 3A:
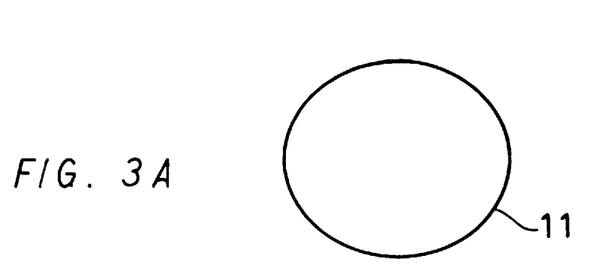
FIGS. 3A–3D are schematic views to show the reaction condition in the producing process of Example 3, where a spherical aluminum compound is used.
Figure 3B:
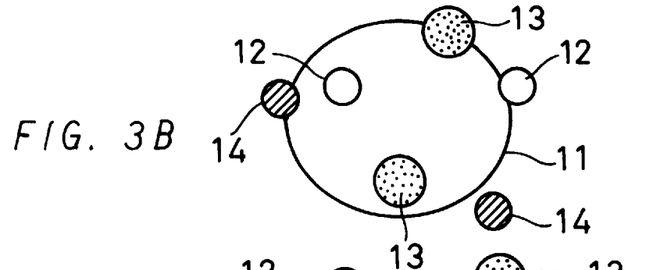
Figure 3C:
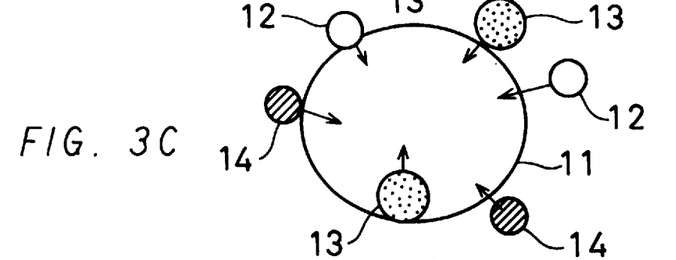
Figure 3D:
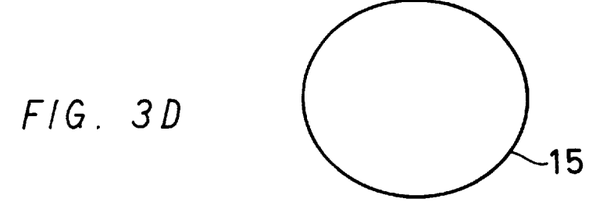

FIG. 3A shows a spherical alpha-alumina particle (11) as a raw material of BAM phosphor. FIG. 3B shows the mixture of the alpha-alumina (11), barium carbonate (12), basic magnesium carbonate (13), and europium oxide (14). FIG. 3C shows the condition of the mixture while it is being fired. FIG. 3D shows the synthesized BAM phosphor (15). The synthesis process is identical to that of Example 1.

The spherical 10 μm diameter alpha-alumina (11) in FIG. 3A is mixed and pulverized with the other materials, namely, barium carbonate (12), basic magnesium carbonate (13), europium oxide (14). Only alpha-alumina is not well pulverized due to its hardness, and thus the diameter and shape do not change substantially (FIG. 3B). During the firing process at 1600° C. or at a higher temperature, the other materials, namely barium carbonate (12), basic magnesium carbonate (13), europium oxide (14) are diffused into and contaminate the alpha-alumina (11) (FIG. 3C), and as a result, a BAM phosphor (15) having the same particle diameter (10 μm), and the same shape of the alpha-alumina (11) is provided as shown in FIG. 3D.

Figure 4:
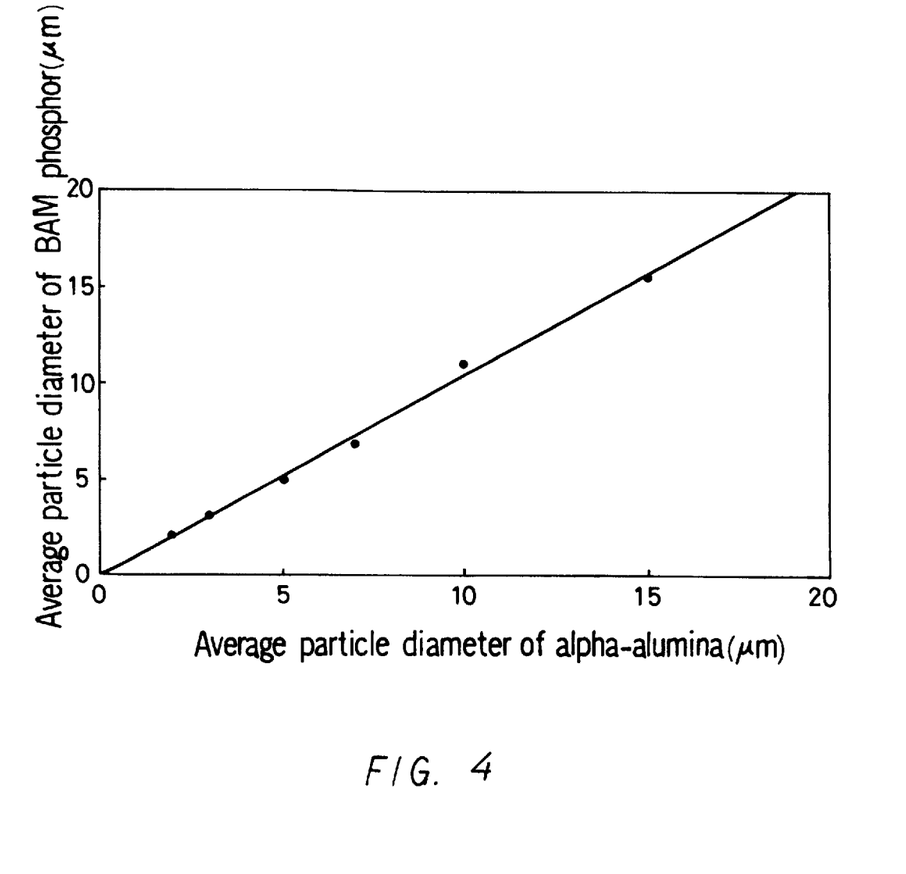
FIG. 4 is a graph to show the relationship between the particle diameter of BAM phosphor and that of alumina material.

FIG. 4 shows the relationship between the average particle diameter of the BAM phosphor and that of the alpha-alumina. The horizontal axis indicates the average particle diameter of the alpha-alumina as the raw material, and the vertical axis indicates the average particle diameter of the synthesized BAM phosphor. It is clear from FIG. 4 that the average particle diameter of the alpha-alumina (raw material) has a close relationship with the average particle diameter of the BAM phosphor.

Figure 5A:
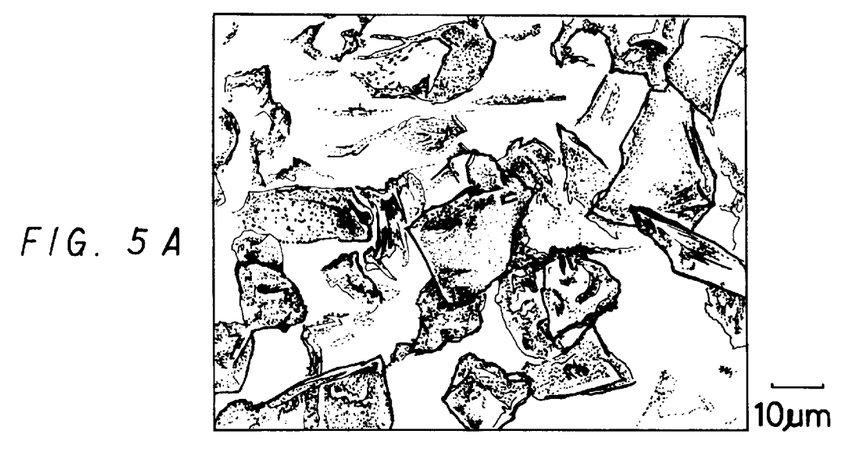
FIGS. 5A–5C are sketches of an electron microscope pictures to show the observatory result of the reaction condition in the producing steps where angular aluminas are used for the aluminum compound material in Example 3.
Figure 5B:
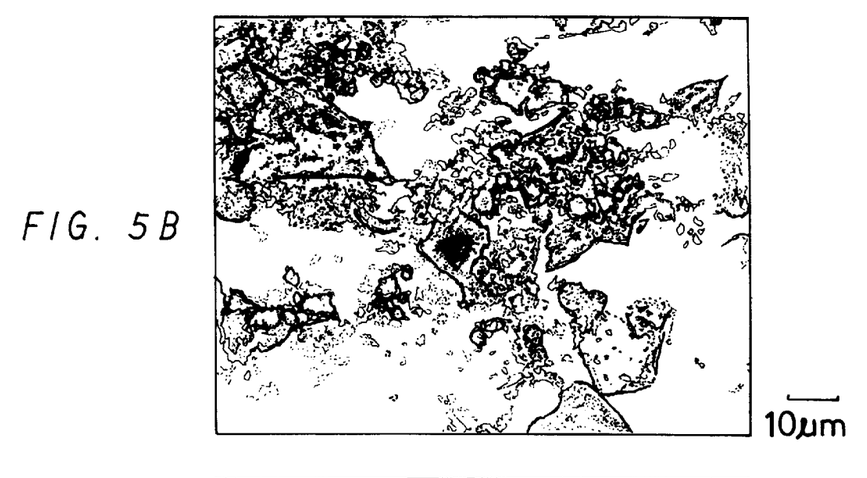
Figure 5C:
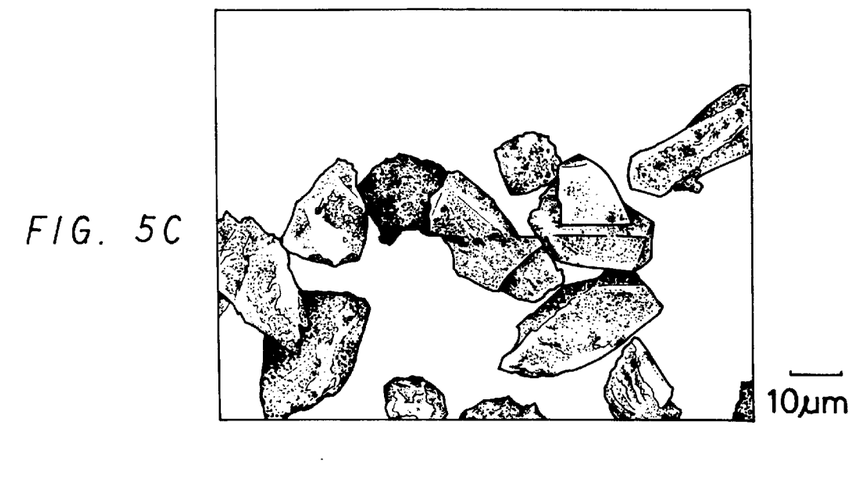

FIGS. 5A–5C are sketches of electron microscope pictures to show the aluminate phosphors before and after the firing step. Here, angular aluminas of about 15 μm diameters are used for the raw materials. FIGS. 5A, 5B, and 5C respectively correspond to the steps of FIGS. 4A, 4B, and 4D. It is clear from the comparison of FIGS. 5A with 5C that the particle diameter and the angular shape of the alpha-alumina are maintained even after the firing treatment.

As mentioned above, aluminate phosphors having predetermined particle diameter and shape can be obtained without using fluorine compounds, by selecting the particle diameter and shape of the aluminum compounds.

In Examples 1 and 3, aluminum phosphors expressed by the formula $(Ba_{0.9},Eu_{0.1})MgAl_{10}O_{17}$ were used for explanation. The composition is preferably in the following range in order to create uniform crystals:$(Ba_{1-w},Eu_w)Mg_xAl_yO_z$, where $0.03 \leq w \leq 0.3$, $0.8 \leq x \leq 1.2$, $8 \leq y \leq 12$, $14 \leq z \leq 20$.

It is further preferable in the formula that $0.03 \leq w \leq 0.3$, $0.97 \leq x \leq 1.03$, $9.7 \leq y \leq 10.3$, $16 \leq z \leq 18$, so that the aluminate phosphors are more stable against oxidization caused by heat. As a result, the luminance of the obtained aluminate phosphors much less deteriorates because of the heating process in the atmosphere for coating the phosphors on a device.

In the Examples, barium carbonate and basic magnesium carbonate were used as the alkaline earth metal compounds to produce the BAM phosphors. Some other alkaline earth metal compounds including barium nitrate and barium chloride also can be used. Aluminum compounds including gamma-alumina, aluminum chloride, aluminum nitrate, aluminum sulfate and tri-isopropoxy aluminum also can be used. It is further preferable that an aluminum compound which is not an oxide is pre-fired in an oxidizing atmosphere, so that unnecessary elements other than oxygen are prevented from being contaminated as impurities in the phosphor.

As alkaline earth metal compounds, calcium compounds or strontium compounds also can be added. Manganese compounds like manganese oxide also can be added in order to improve the luminance.

In Example 2, an aluminum phosphor expressed by the formula $(Ce_{0.67},Tb_{0.33})MgAl_{11}O_{19}$ was used for explanation. The composition is preferably in the following range in order to create uniform crystals:$(Ce_{1-w},Tb_w)Mg_xAl_yO_z$, where $0.0 \leq w \leq 0.6$, $0.8 \leq x \leq 1.2$, $9 \leq y \leq 13$, $15 \leq z \leq 23$. It is further preferable in the formula that $0.03 \leq w \leq 0.6$, $0.97 \leq x \leq 1.03$, $10.7 \leq y \leq 11.3$, $18 \leq z \leq 20$, so that the aluminate phosphors are more stable against oxidization caused by heat. As a result, the luminance of the obtained aluminate phosphors deteriorates much less because of the heating process in the atmosphere for coating the phosphors on a device.

In Examples 1 to 3, $(Ba_{0.9},Eu_{0.1})MgAl_{10}O_{17}$ and $(Ce_{0.67},Tb_{0.33})MgAl_{11}O_{19}$ are taken for consideration. Similar effects can be obtained if the composition of the phosphor is, for example, $(Sr, Eu)_4 Al_{14}O_{25}$, $(Sr, Eu)Al_2O_4$, or $(Ca, Eu)Al_2O_4$.

In Example 3, the shape of the alpha-alumina (11) can be selected from the group consisting of plate, hexagonal plate, spherical, and capillary. It is further preferable that the alpha-alumina (11) is spherical or substantially spherical, so that the luminance of the obtained aluminate phosphor will much less deteriorate when the aluminate phosphor is heated in air before coating process.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for producing aluminate phosphor, wherein an alkaline earth metal compound containing no fluorine atoms in its molecules, a rare earth compound containing no fluorine atoms in its molecules, and an aluminum compound containing no fluorine atoms in its molecules are mixed together and then fired in a reducing atmosphere at a temperature from 1600° to 2000° C.; wherein the alkaline earth metal compound is a barium compound and a magnesium compound containing no fluorine atoms in their molecules, the rare earth compound is an europium compound containing no fluorine atoms in its molecules, and the aluminate phosphor comprises the materials expressed by the following formula:

$$(Ba_{1-w},Eu_w)Mg_xAl_xO_z,$$

where $0.03 \leq w \leq 0.3$, $0.8 \leq x \leq 1.2$, $8 \leq y \leq 12$, and $14 \leq z \leq 20$.

2. The method for producing aluminate phosphor according to claim 1, wherein the reducing atmosphere is a mixture of gaseous hydrogen and gaseous nitrogen.

3. The method for producing aluminate phosphor according to claim 2, wherein the concentration of the gaseous hydrogen ranges from 0.1 to 10 volume % of the reducing atmosphere comprising the mixture of the gaseous hydrogen and the gaseous nitrogen.

4. The method for producing aluminate phosphor according to claim 1, wherein the firing time is at least five minutes.

5. The method for producing aluminate phosphor according to claim 1, wherein the particle diameter of the aluminum compound containing no fluorine atoms in its molecules is substantially the same as that of the aluminate phosphor.

6. The method for producing aluminate phosphor according to claim 5, wherein the particle diameter of the aluminum compound containing no fluorine atoms in its molecules ranges from 1 to 20 $\mu$m.

7. The method for producing aluminate phosphor according to claim 1, wherein the particle shape of the aluminum compound containing no fluorine atoms in its molecules is substantially the same as that of the aluminate phosphor.

8. The method for producing aluminate phosphor according to claim 7, wherein the aluminum compound is spherical or substantially spherical.

9. The method for producing aluminate phosphor according to claim 1, wherein the alkaline earth metal compound containing no fluorine atoms in its molecules is at least one selected from the group consisting of oxide, carbonate, basic salt, nitrate and chloride of an alkaline earth metal.

10. The method for producing aluminate phosphor according to claim 1, wherein the rare earth compound containing no fluorine atoms in its molecules is at least one selected from the group consisting of oxide, carbonate, basic salt, nitrate and chloride of a rare earth element.

11. The method for producing aluminate phosphor according to claim 1, wherein the aluminum compound containing no fluorine atoms in its molecules is at least one selected from the group consisting of oxide, chloride, nitrate, sulfate and alkoxide of aluminum.

12. In a fluorescent lamp using a phosphor, the improvement where the phosphor is produced by the method of claim 1.

13. A method for producing aluminate phosphor, wherein an alkaline earth metal compound containing no fluorine atoms in its molecules, a rare earth compound containing no fluorine atoms in its molecules, and an aluminum compound containing no fluorine atoms in its molecules are mixed together and then fired in a reducing atmosphere at a temperature from 1600° to 2000° C.; wherein the alkaline earth metal compound is a strontium compound containing no fluorine atoms in its molecules, the rare earth compound is an europium compound containing no fluorine atoms in its molecules, and the aluminate phosphor comprises the materials expressed by the following formula:

$$(Sr_{4(1-w)},Eu_{4w})Al_xO_y,$$

where $$0.01 \leq w \leq 0.6, 11 \leq x \leq 17, \text{ and } 20 \leq y \leq 30.$$

14. The method for producing aluminate phosphor according to claim 13, wherein the reducing atmosphere is a mixture of gaseous hydrogen and gaseous nitrogen.

15. The method for producing aluminate phosphor according to claim 14, wherein the concentration of the gaseous hydrogen ranges from 0.1 to 10 volume % of the reducing atmosphere comprising the mixture of the gaseous hydrogen and the gaseous nitrogen.

16. The method for producing aluminate phosphor according to claim 13, wherein the firing time is at least five minutes.

17. The method for producing aluminate phosphor according to claim 13, wherein the particle diameter of the aluminum compound containing no fluorine atoms in its molecules is substantially the same as that of the aluminate phosphor.

18. The method for producing aluminate phosphor according to claim 17, wherein the particle diameter of the aluminum compound containing no fluorine atoms in its molecules ranges from 1 to 20 μm.

19. The method for producing aluminate phosphor according to claim 13, wherein the particle shape of the aluminum compound containing no fluorine atoms in its molecules is substantially the same as that of the aluminate phosphor.

20. The method for producing aluminate phosphor according to claim 19, wherein the aluminum compound is spherical or substantially spherical.

21. The method for producing aluminate phosphor according to claim 13, wherein the alkaline earth metal compound containing no fluorine atoms in its molecules is at least one selected from the group consisting of oxide, carbonate, basic salt, nitrate and chloride of an alkaline earth metal.

22. The method for producing aluminate phosphor according to claim 13, wherein the rare earth compound containing no fluorine atoms in its molecules is at least one selected from the group consisting of oxide, carbonate, basic salt, nitrate and chloride of a rare earth element.

23. The method for producing aluminate phosphor according to claim 13, wherein the aluminum compound containing no fluorine atoms in its molecules is at least one selected from the group consisting of oxide, chloride, nitrate, sulfate and alkoxide of aluminum.

24. In a fluorescent lamp using a phosphor, the improvement where the phosphor is produced by the method of claim 13.

* * * * *

UNITED STATES PATENT AND TRADEMARK OFFICE
CERTIFICATE OF CORRECTION

PATENT NO. : 5,879,586
DATED : March 9, 1999
INVENTOR(S) : Kitamura et al.

It is certified that error appears in the above-identified patent and that said Letters Patent is hereby corrected as shown below:

Column 2,
Line 25, "and $15z \leqq 23$." should read -- and $15 \leqq z \leqq 23$. --

Column 12,
Line 10, "$(Ba_{1-w}, Eu_w)Mg_xAl_xO_z$," should read -- $(Ba_{1-w}, Eu_w)Mg_xAl_yO_z$, --

Signed and Sealed this

Fifteenth Day of April, 2003

JAMES E. ROGAN
*Director of the United States Patent and Trademark Office*